March 11, 1941.  H. D. GEYER  2,234,756
FRICTION CLUTCH
Filed April 3, 1939
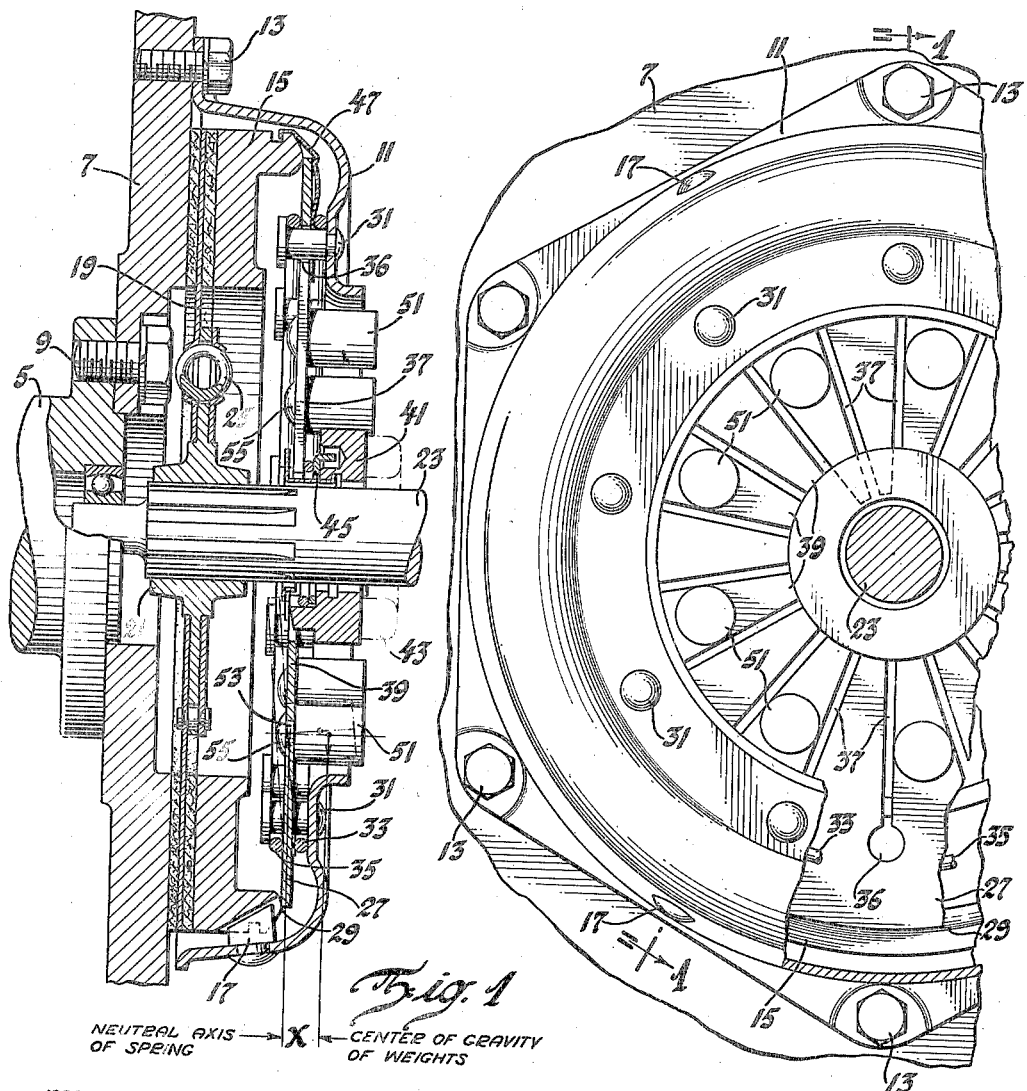
Fig. 1
Fig. 2
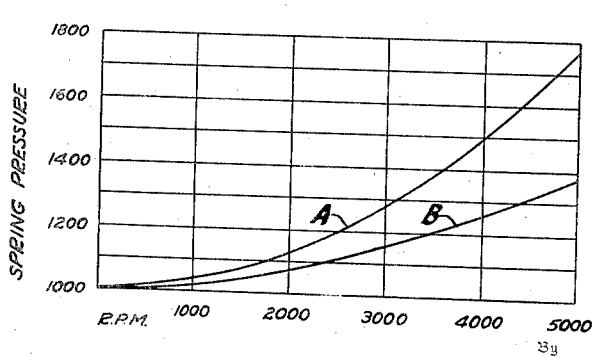
Fig. 3
Inventor
Harvey D. Geyer
By Blackmore, Spencer & Flint
Attorneys Patented Mar. 11, 1941

2,234,756

UNITED STATES PATENT OFFICE 2,234,756

FRICTION CLUTCH

Harvey D. Geyer, Dayton, Ohio, assignor to General Motors Corporation, Detroit, Mich., a corporation of Delaware Application April 3, 1939, Serial No. 265,728

4 Claims. (Cl. 192—105)

This invention relates to clutches and has been designed particularly for use as a releasable coupling between the engine shaft of the motor vehicle and the input shaft of the change speed transmission.

An object of the invention is to provide a clutch wherein frictionally engaging driving and driven members are pressed together with a force which varies automatically with changes in the speed of the driving member.

A further object is to accomplish the above stated major object with an arrangement wherein the load on the clutch throwout mechanism decreases in response to the movement of the throwout member and as the driving member decelerates.

Other objects and advantages will be understood from the description which follows.

On the drawing:

Figure 1 is a transverse section, the section being shown on Figure 2 by line 1—1.

Figure 2 is a view in elevation partly broken away.

Figure 3 is a diagram showing the results accomplished by the novel structure.

Referring to the drawing, numeral 5 represents the engine shaft and 7 is a flywheel secured thereto by fastening means 9. Numeral 11 represents a cover secured to the flywheel at 13. Within the cover is a pressure plate 15 having at 17 suitable provision whereby it rotates with but may slide axially relative to the cover. Between the pressure plate and flywheel is a driven plate 19. The driven plate is connected to a hub 21 on a driven shaft 23 by torque transmitting springs 25.

The pressure plate is urged into driving position by a coned spring disc 27. This disc engages the edge 29 of the pressure plate, the engagement forming a line contact. The cover carries a circular series of pins 31 which pins carry rings 33 and 35, one on each side of the spring plate 27 which is assembled on the pins, the pins extending through openings 36 in plate 27. From the openings there are formed in the spring plate radial slots 37 forming spring tongues 39. In the process of assembly the coned spring is flattened between its regions of contact at 29 and 33, the ring 33 thus taking the reaction when the spring acts on the pressure plate. A reciprocable throwout ring 41 is actuated by a fork, only the arms 43 of which are shown on the drawing. Any suitable means 45 may be used to secure the ends of the fingers to the ring 41. When the ring 41 is moved to the left as shown by Figure 1 the load is taken from the ring 33 and the spring plate is fulcrumed about ring 35 thus removing the spring load from the pressure plate. To free the pressure plate from the driven plate when the spring load is thus released, suitable spring means such as 47 may be employed. In so releasing the clutch the spring fingers bend, thus lessening the manual effort which would be required if the spring disc were rigid all the way to its central opening.

Clutches substantially as above described are well known. To improve the action there are added, in accordance with this invention, a set of weights 51. As shown, one such weight is associated with each alternate spring arm 39 and the weights are positioned somewhat midway between the fulcrum rings 33 and 35 and the central region of connection with the throwout ring 41. Each weight is secured to the spring by the provision of a narrow stem 53 which extends through the spring disc and an enlarged head 55. The center of mass of each weight is at a predetermined axial distance marked X from the neutral axis of the spring disc. By selecting the mass of each weight and locating its center of gravity the influence of the centrifugal force may be as desired.

It is to be remembered that the cover, the spring assembly and the pressure plate rotate jointly with the flywheel and engine shaft. The weights are therefore rotating with this assembly and exert a centrifugal force dependent upon their masses and their lever arms X. As the revolutions of the engine increase therefore the centrifugal force resulting from the presence of these weights causes additional forces to be applied through the spring 27 upon the pressure plate and a corresponding increased reaction at 33. Consequently the greater the speed of the engine shaft the more effective is the grip upon the driven plate and the less is the danger of clutch slipping.

As a result of this arrangement it may be possible to reduce the weight of the spring disc. In the diagram the curve marked A shows how the pressure on the pressure plate increases as a result of the increase in engine speed in consequence of the presence of these weights.

The advantage of this added gripping of the driven plate might be in part offset if the throwout mechanism required additional effort on the part of the operator. The construction, however, not only does not require appreciably greater manual effort in the act of clutch release but the manual effort during the progress of clutch release is progressively reduced. It should be observed that when the clutch is in operation the lever arm of the weight is X. Since, however, the arms 39 are bowed in the act of clutch release, as is shown by Figure 1, the center of gravity of each weight is brought toward the plane of the neutral axis of the spring by the movement of the throwout mechanism. This in effect reduces the lever arm through which the weights operate. In this way, not only does the deceleration of the engine reduce the centrifugal force with which the weights operate but the reduction of the effective lever arm reduces the effect of the rotating masses so that if the initial pressure at the throwout mechanism is as shown by the right end of curve B in the diagram, this pressure is very appreciably reduced as the declutching action progresses and as the engine is allowed to decelerate. The curve B shows the progressive reduction in manual effort required, the right end of the curve indicating the initial spring pressure to be overcome by manual effort and the left end showing the spring pressure to be resisted upon full clutch release.

It will be evident that by the extremely simple expedient of adding these weights to the spring arms it is possible to obtain a clutch wherein a rather light cone spring may be used and one having a relatively low spinning weight. Such a construction may be used without danger of clutch slipping. In the act of clutch release, the operator is not required to maintain any considerable pressure on the throwout mechanism. In fact the arrangement reduces the pressure required of the operator during the progress of pedal movement and engine deceleration.

I claim:

1. In a clutch, a driving member, a spring disc rotatable therewith and prestressed to effect clutch engagement, a plurality of weights secured to one side of said disc to increase, under the influence of centrifugal force, the pressure exerted by said disc.

2. In a clutch, a driving member, a spring disc rotatable therewith and prestressed to effect clutch engagement, a plurality of weights secured to one side of said disc to increase, under the influence of centrifugal force, the pressure exerted by said disc, together with means operable upon said spring disc to release the clutch whereby said weights are adapted to be moved toward the neutral axis of said disc to lessen the effect of centrifugal force and reduce the effort of clutch release.

3. In a clutch, first and second driving members having relative axial movements, an abutment secured to and spaced from said first driving member, a driven member between said driving members, a spring disc yieldingly engaging said second driving member and reacting against said abutment, throwout means operable upon the inner margin of said spring disc, a plurality of weights mounted upon one side of said disc and located radially within said abutment reaction contact region.

4. The invention defined by claim 3, said spring disc having radially extending spring fingers, said weights being attached to said fingers whereby the center of gravity of said weights may be moved by the throwout mechanism toward the neutral axis of said spring disc in the progressive movement of clutch release.

HARVEY D. GEYER.